United States Patent
Sipolins et al.

(10) Patent No.: US 12,441,238 B2
(45) Date of Patent: Oct. 14, 2025

(54) CONTEXTUAL VEHICLE HORN

(71) Applicant: Adeia Guides Inc., San Jose, CA (US)

(72) Inventors: Aldis Sipolins, Somerville, MA (US); Tao Chen, Palo Alto, CA (US); Toshiro Ozawa, Irvine, CA (US)

(73) Assignee: Adeia Guides Inc., San Jose, CA (US)

( * ) Notice: Subject to any disclaimer, the term of this patent is extended or adjusted under 35 U.S.C. 154(b) by 103 days.

(21) Appl. No.: 18/495,168

(22) Filed: Oct. 26, 2023

(65) Prior Publication Data

US 2025/0135992 A1    May 1, 2025

(51) Int. Cl.
B60Q 5/00    (2006.01)

(52) U.S. Cl.
CPC ................... B60Q 5/005 (2013.01)

(58) Field of Classification Search
CPC .... B60Q 5/005; G08G 1/0175; G08G 1/0969; G01C 21/3632; G01C 21/3688
See application file for complete search history.

(56) References Cited

U.S. PATENT DOCUMENTS

| | | | | |
|---|---|---|---|---|
| 6,345,230 B1 * | 2/2002 | Hiyokawa | ............ | G08G 1/0969 701/437 |
| 6,374,183 B1 * | 4/2002 | Oshida | ................ | G01C 21/3626 340/995.23 |
| 6,427,115 B1 * | 7/2002 | Sekiyama | .......... | G01C 21/3688 701/526 |
| 8,751,106 B2 * | 6/2014 | Raz | .......................... | B60Q 5/00 381/340 |
| 9,884,583 B2 * | 2/2018 | Trinh | ....................... | G06F 3/167 |
| 10,741,076 B2 * | 8/2020 | Kumar | ................. | G08G 1/0175 |
| 10,953,852 B1 * | 3/2021 | Krishnamurthi | ....... | B60Q 5/005 |
| 11,624,228 B1 * | 4/2023 | Austria | .................... | E05F 15/43 340/5.72 |
| 2003/0060971 A1 * | 3/2003 | Millington | ......... | G01C 21/3632 701/454 |
| 2014/0055260 A1 * | 2/2014 | Chhaunker | .............. | H03G 3/02 340/474 |
| 2015/0002313 A1 * | 1/2015 | Caskey | ............ | G08G 1/096741 340/902 |
| 2025/0135991 A1 * | 5/2025 | Sipolins | .................... | B60Q 5/00 |
| 2025/0135992 A1 * | 5/2025 | Sipolins | ................. | B60Q 5/005 |

OTHER PUBLICATIONS

"Google Self-Driving Car Project Monthly Report," (May 2016),(3 pages).

* cited by examiner

*Primary Examiner* — Hoi C Lau
(74) *Attorney, Agent, or Firm* — HALEY GUILIANO LLP

(57) ABSTRACT

An audible output of a vehicle is controlled based on a variety of driving characteristics and ambient conditions. In response to receiving an indication of a triggering of an activator of a horn of a vehicle, the system determines a driving characteristic of the vehicle based on vehicle sensor data. Then, based on the driving characteristic(s) determined, and/or based on the ambient conditions, an audible output tune is automatically set for output by the vehicle. A tune and volume of the audible output selected when the driving conditions and ambient conditions indicate an emergency situation will be different from the tune and volume selected for a non-threatening situation. Also, an audible output tune may be selected to be output at a later time when the vehicle reaches a destination to signal a person at the destination that the vehicle has arrived.

20 Claims, 10 Drawing Sheets

FIG. 5

| | Situation 1: Late-Night Green Light Reminder | Situation 2: Out of Control |
|---|---|---|
| Relevant driving factors | Has been stopped for 12s | 4s ago was driving steadily at 80mph. Now vehicle is swerving and user is slamming the brakes |
| Relevant temporal factors | 2AM | |
| Relevant environmental factors | At an intersection behind a vehicle. Light turned green 2s ago. In a residential neighborhood. Ambient noise: 32dBA. New York regulations require the horn to be audible from 200ft away. Given the ambient noise level, that requires a horn volume of >60dBA | Road is wet from recent rain. In New York, the maximum vehicle sound on 35mph+ roads at 82dB |
| Chosen horn type | Soft, short pulse | Emergency alarm |
| Chosen horn volume | 60dBA | 82BA |

511
521
531
541
551

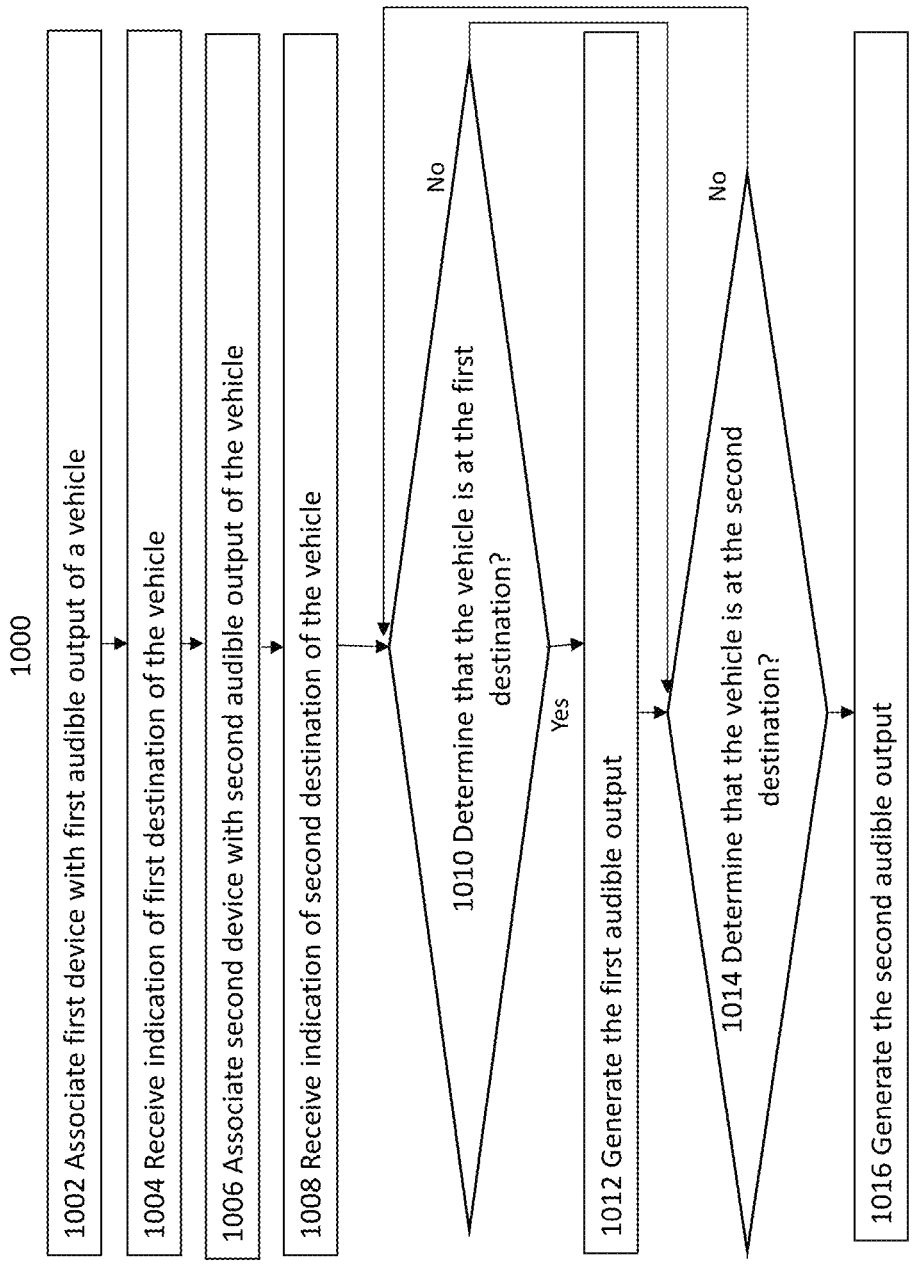

CONTEXTUAL VEHICLE HORN

BACKGROUND

The present disclosure relates to controlling a vehicle audible output, such as a horn, based on contextual factors and, in particular, to controlling a vehicle audible output volume and tune or tone based on vehicle driving parameters and ambient conditions, and controlling a vehicle audible output tune or tone to communicate with intended external users.

SUMMARY

A technological problem is that vehicle horns are a means of communication but often they are capable of producing only a single signal unrelated to the vehicle's surroundings and to their vehicle's driving conditions. The audible output produced by the horns of automobiles and other vehicles may be divorced from the needs for which they are activated and from the local conditions in which their sound is called for. For example, a driver may trigger a button to activate a horn to signal a pedestrian in a quiet neighborhood, which may call for a relatively low volume audible output with a friendly tune to avoid frightening the pedestrian and to avoid causing a nuisance for the neighborhood. On the other hand, the horn may be needed to signal that the vehicle is skidding at high speed on a busy highway, which may call for a high volume audible output with an urgent tune, tone or sound.

According to one approach, a vehicle horn volume may be controlled based on time and location of the vehicle. However, the vehicle's driving characteristics often need to be taken into account in generating an audible output. Also, the tune or other sound characteristics, besides volume, may be relevant to effective communication with other vehicles or nearby pedestrians.

In another approach, an automobile driver's head gaze is tracked and user gestures activate signals, such as vehicle headlights or the vehicle horn. However, what is still needed is a reliable way of controlling volume and tone/tune of the audible output when a vehicle driver triggers the horn activator.

In a further approach, an audible output of an autonomous vehicle may be automatically varied based on activities of other vehicles in the field of vision of the autonomous vehicle. But a vehicle's own driving characteristics may also be relevant to the type of audible output needed. Also, drivers may want control over the activation of the vehicle horn and, therefore, contextual control of the audible output may be needed also when a vehicle driver triggers activation of the horn.

A technological solution to these and other technological problems, according to an aspect of the present disclosure, is that when an activator of a horn of a vehicle is triggered, one or more driving characteristics of the vehicle, such as an indication representing one or more of the following: a vehicle speed, an acceleration of the vehicle, an acceleration pedal activation of the vehicle, a brake pedal activation of the vehicle, an activation of a component of the braking system of the vehicle, a brake locking of the vehicle, hydroplaning of the vehicle, tire traction of the vehicle, tire rotation speed of the vehicle, steered wheels turning status of the vehicle, a selected gear of the vehicle, a gear stick position of the vehicle, a tachometer reading of the vehicle, a steering wheel position of the vehicle, an airbag activation status of the vehicle, a swerving indication for the vehicle, a current stoppage time of the vehicle, or the like, is/are used to automatically select a horn volume, and/or a horn tune or tune type, and to generate an audible output accordingly. Ambient conditions at or near the vehicle, such as a time of day, day of the week, type of neighborhood, outside noise level, traffic signals and signs, and the like, may also be considered in selecting horn volume and tune or tune type.

A method, system, non-transitory computer-readable medium, and means for implementing the method are disclosed for controlling an audible output of a vehicle. In response to receiving, at a first time, an indication of a triggering of an activator of a horn of a vehicle, a driving characteristic of the vehicle is determined. Then, based on the driving characteristic detected by sensors of the vehicle, an audible output tune may be determined automatically by an electronic control system of the vehicle, or by a central processor connected via a network with a control system of the vehicle. Based on the driving characteristic of the vehicle, a first volume may be determined and then the control system can generate a first audible output for the vehicle according to the audible output tune.

A first ambient condition external to the vehicle may also be determined. For example, sensors may determine that it is dark and a pedestrian is ahead of the vehicle in close proximity thereto. The first audible output volume may be determined also based on the first ambient condition. The first ambient condition may be an indication of one or more of the following: a time of day, a location of the vehicle, an ambient noise level, local noise norms or patterns, local vehicular horn levels or patterns or a local noise regulation, a weather condition, an ambient lighting condition, a traffic signal, a traffic sign, a traffic condition, an approaching vehicle condition, a proximal vehicle condition, a proximal pedestrian condition, a distance of the vehicle to another vehicle, person, or nearby object.

The audible output tune, for example, a stark, loud shriek or other emergency-evoking sound, may be determined based on the first ambient condition external to the vehicle, wherein the determining of the audible output tune is further based on the first ambient condition.

In an embodiment, such a method may also entail determining a first ambient condition external to the vehicle, and using this first ambient condition to determine the first audible output. At a second time subsequent to the first time, after the generating of the first audible output for the vehicle, a second ambient condition external to the vehicle may be determined, and in response to the determining of the second ambient condition at the second time, the system may automatically select a second audible output volume different from the first audible output volume. For example, if an ambient condition persists at the second time, the second audible output may be louder, and/or may be more insistent-sounding, then the first audible output to signal a growing frustration with whatever situation is outside. This second audible output for the vehicle is generated based on the second audible output volume. The second audible output may be generated automatically as a further response to the indication at the first time of the triggering of the horn activator. Or, the second audible output may be generated only in response to a subsequent triggering by the driver of the horn activator.

The speed or amount of user force imparted to the activator of the horn may also be taken into account by the system to determine the first audible output volume. For example, if an automobile is detected to be double parked or to be executing parking maneuvers in front of the vehicle in excess of a predetermined time length, for example, in excess of 3-90 seconds, then a rapid or forceful depressing of the horn activator may cause the system to generate an audible output with a more assertive tune or tune, or with a greater volume than pressing the horn activator with an average or moderate amount of force. Similarly, if the horn activator is pressed a second time within a short time interval, for example, 1-90 seconds, then this second activation may cause generation of an audible output with a more assertive tune or with a greater volume than the first activation. Also, if a first ambient condition external to the vehicle is determined and the first audible output is generated in response thereto, and then a change in this first ambient condition is determined, then the first audible output may be modified based on the change in the first ambient condition.

A further technological problem is that a vehicle horn may be indiscriminate but nearby devices and their users cannot know with whom communication with the horn is intended. In an embodiment, the audible output tune may be selected by, or communicated to, an external device with which audible output signaling is intended. For example, a cellphone of a prospective passenger may select, or may be notified of, an audible output tune that is to be audibly output when the vehicle reaches a destination. In this way, the vehicle may play the audible output when the vehicle arrives at the destination to alert the prospective passenger of the arriving vehicle. Similarly, the selected audible output may be output by the vehicle whenever it is detected that the cellphone of a friend or prospective passenger is in close proximity to the vehicle.

A method, system, non-transitory computer-readable medium, and means for implementing the method are disclosed for providing an audible output notification to an external device. A first device external to the vehicle is associated with an indication of a first audible output tune, for example, a particular portion of a song or tune pattern or riff. Based on user input on the first device, an indication of a first destination for the first device is received. For example, a user of a cellphone, provided as the first device, may enter a desired destination to an app of a taxi or limousine service and may also select an audible output tune, song to be output by the horn of the vehicle that is to meet the user at the desired destination. Or, the audible output tune may be selected by a control system of the vehicle, or by a server associated with the taxi or limousine application, or by the taxi or limousine application, and notified to the first device and/or to the vehicle. A second device distinct from the first device and distinct from the vehicle may then be associated with an indication of a second audible output tune. The second audible output tune is distinct from the first audible output tune so that at the destination different users may distinguish between the audible outputs and recognize their respective vehicles. Based on user input on the second device, an indication of a second destination for the second device may be received. Then, after the vehicle arrives at the first destination, the first audible output may be generated automatically by the vehicle, according to the first audible output tune. In response to determining that the vehicle is at the second destination, the second audible output may be generated automatically by the vehicle according to the second audible output tune. The first destination may be the same as the second destination.

After the first audible output is generated at a first time, a third audible output may be generated, at a subsequent time, by the vehicle at a higher volume than the first audible output. The third audible output may have the same tune or be the same musical piece excerpt as the first audible output or it may be different therefrom.

The first audible output tune may be selected based on information accessed in a user profile associated with the first device. For example, the system may suggest that the first audible output be a song, or portion thereof, that is accessed in the first device or another device associated with the user of the first device, or may suggest that the first audible output be a song, or portion thereof, that is of an artist, composer, musical composition genre or sound type that is accessed in the first device or another device associated with the user of the first device.

The first device may automatically play the first audible output to alert the user of the first device that the user has arrived at the first destination agreed on, and/or that the vehicle has arrived at the first destination, and/or that both the first device and the vehicle are detected at the first destination or are detected near each other. In addition, or instead, the first device may automatically play the first audible output when the horn activator in the vehicle is triggered. This may signal the user of the first device that the vehicle is waiting. Also, vehicle sensors may use facial recognition to identify the user associated with the first device and may generate the first audible output automatically when the vehicle is at the first destination and the user is recognized near the vehicle.

Other aspects and features of the present disclosure will become apparent to those ordinarily skilled in the art upon review of the following description of specific embodiments in conjunction with the accompanying figures.

BRIEF DESCRIPTION OF THE DRAWINGS

The present disclosure, in accordance with one or more various embodiments, is described in detail with reference to the following Figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 5 shows two scenarios as examples of vehicle driving condition and ambient conditions, according to an aspect of the disclosure;

FIG. 10 illustrates an example of a process for generating an audible output, according to a previously set audible output embodiment of the disclosure.

DETAILED DESCRIPTION

Figure 1:
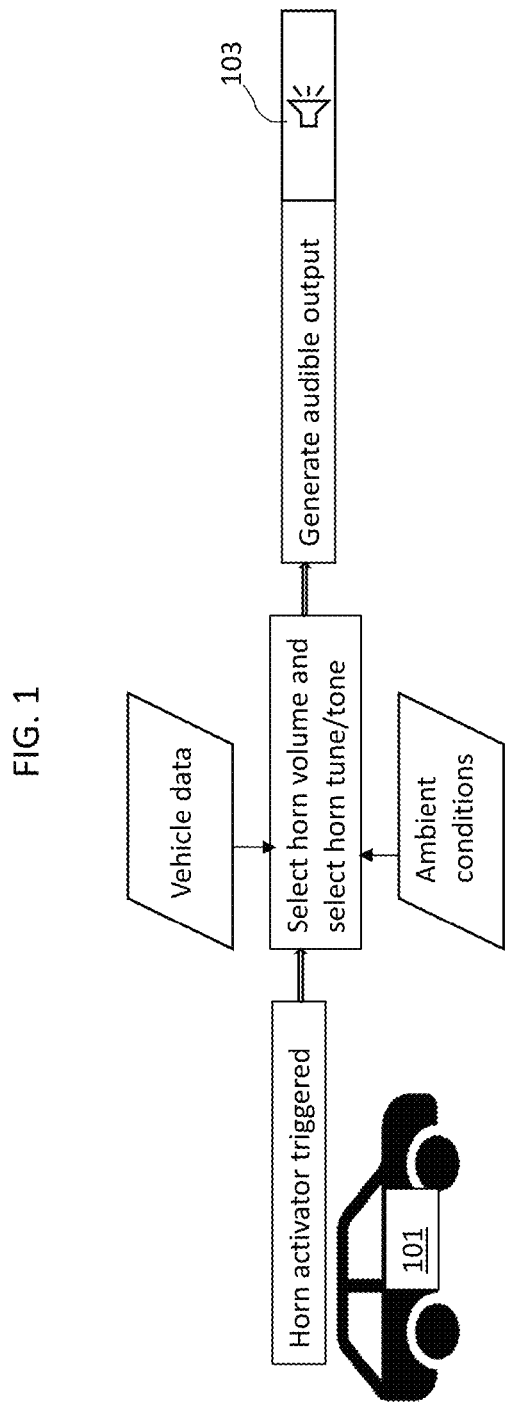
FIG. 1 illustrates an example of a process in which a horn of a vehicle is activated to provide an audible output in response to the triggering of a horn activator when some vehicle driving conditions and/or some ambient conditions are met, according to an aspect of the disclosure.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood that the embodiments and examples described herein may be practiced without these specific details. In other instances, well-known methods, procedures and components, including software, firmware and hardware components, have not been described in detail so as not to obscure the embodiments described herein. Also, the description is not to be considered as limiting the scope of the embodiments described herein.

The term vehicle may include an automobile, SUV, van, truck, bus, motorcycle, moped, bicycle, drone, drivable lawn mower, boat, or airborne vehicle. The term horn may refer to any type of device, including a device with one or more speakers, which produces an audible output audible outside a vehicle. The term audible output tune may refer to a song, ditty, jingle, theme, or other musical composition previously known or contrived ad hoc, or to a portion thereof, or to a category or genre thereof, or to a pattern of sounds, pitches or a combination of tunes, tones, pitches or other sound patterns.

FIG. 1 illustrates an example of an operation of a vehicle 101 and a horn 103, according to an aspect of the present disclosure. A horn button, horn bar or other horn activator or the like, in the vehicle 101 may be triggered. For example, a steering wheel of an automobile may include a depressible area, button, bar, ring or other type of switch for activating the horn of the vehicle. In response to the triggering of the horn activator, vehicle data may be accessed to determine one or more vehicle driving characteristics at the time, and/or before the time of the triggering of the horn activator.

Such vehicle driving characteristics may comprise or relate to a signal or other indication of one or more of a speed of the vehicle, an acceleration of the vehicle, an acceleration pedal activation of the vehicle, a brake pedal activation of the vehicle, a brake activation of the vehicle, a brake locking of the vehicle, hydroplaning of the vehicle, tire traction of the vehicle, vehicle tire rotation speed of the vehicle, vehicle tire rotation acceleration, steered wheels turning status of the vehicle, a selected gear of the vehicle, a gear stick position of the vehicle, a tachometer reading of the vehicle, a steering wheel position of the vehicle, an airbag activation status of the vehicle, a swerving of the vehicle, a current stoppage time of the vehicle (how long the vehicle has been stopped), or a position of the vehicle with respect to another vehicle. A combination of sensor data may be used to diagnose or to determine the existence of a such a vehicle driving condition or a combination of such conditions.

As further shown in FIG. 1, an indication of a recent vehicle driving characteristic in combination with an indication of a current driving characteristic may be used to control horn volume and horn tune. More generally, a combination of one or more vehicle driving characteristics may be used to control horn volume and horn tune. For example, if the indication of stoppage time indicates that the vehicle has been stopped for 6 seconds or longer, the system may infer that the pedestrian or driver to be signaled is in close proximity to the vehicle and an audible output volume may be set to low or moderate. In addition, if it is detected that a pedestrian is in close proximity in front of the vehicle, then a friendly, non-threatening tune may be selected by the system for the audible output. On the other hand, if the vehicle driving characteristics include indication of a rapid recent turning of the steering wheel, a forceful activation of the brake pedal, a high rate of rotation of the wheels, a high tachometer reading, a rapid deceleration of the vehicle, or the like, then the audible output volume may be set to high and a more urgent, alarming tune may be set for the audible output, since it may be assumed that the triggering of the horn activator is for an emergency condition.

As also shown in FIG. 1, one or more ambient conditions may also be taken into consideration when selecting audible output volume and audible output tune. An ambient condition may be a signal or indication of a state or an event external to the vehicle, for example, an indication of a time of day, a day of the week, such as weekend, a location of the vehicle, an ambient noise level, a local noise regulation, including a state or municipal regulation or ordinance, local noise norms or patterns, local vehicular horn levels or patterns, a weather condition, an ambient lighting condition, a traffic signal condition, including a traffic signal ahead or proximate the vehicle, a traffic sign condition, including a traffic sign ahead or proximate the vehicle, a traffic condition, an approaching vehicle condition, a proximal vehicle condition, a proximal pedestrian condition, and a distance of the vehicle to an object.

An indication of a recent ambient condition and an indication of a current ambient condition may be used in combination to control horn volume and horn tune. More generally, a combination of indications of one or more ambient conditions may be used to control horn volume and horn tune. Also, indications of one or more ambient conditions may be used in combination with indications of one or more vehicle driving characteristics to control horn volume and horn tune. For example, if a vehicle driving characteristic indicates that the vehicle has been stopped for three or more seconds and an ambient condition indicates that the ambient noise level outside the vehicle is quiet, or an ambient condition indicates that it is late at night and the vehicle is in a neighborhood with a quiet historic noise pattern, then the audio output may be set to a low volume and a friendly tune.

Figure 2:
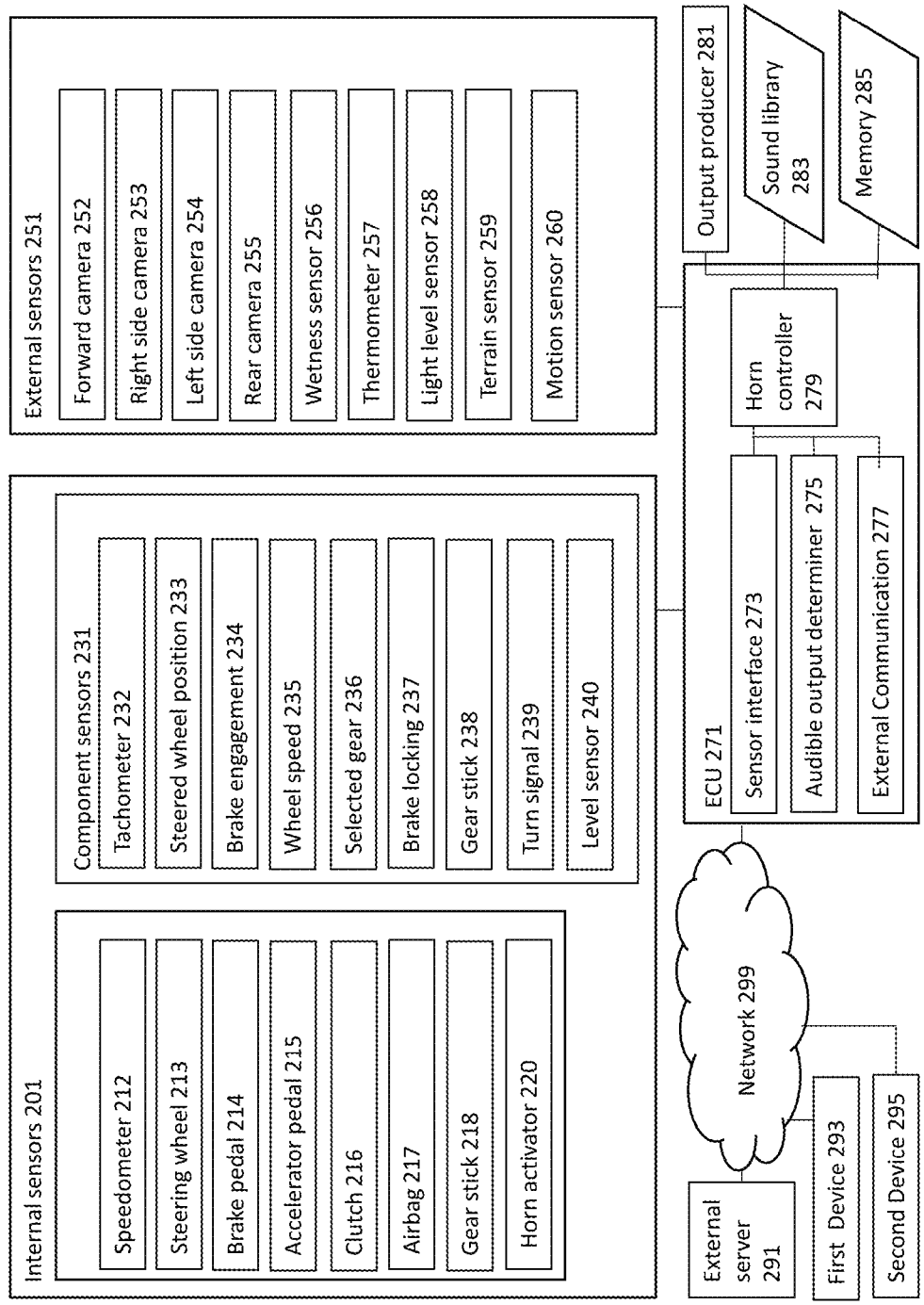
FIG. 2 illustrates an example of a system in which an electronic control system (ECU) of a vehicle receives data from sensors and generates the audible output accordingly, according to an aspect of the disclosure.

FIG. 2 illustrates an example of an electronic control unit (ECU) 271 connected with various vehicle sensors 201-260, a network 299, an audible output producer 281, and sound library 283, according to an aspect of the disclosure. The vehicle 101 may have various internal sensors 201, including cabin sensors 211, such as speedometer 212, steering wheel sensor 213, brake pedal sensor 214, accelerator pedal sensor 215, clutch sensor 216, airbag activation sensor 217, gear stick 218, and horn activator 220. The internal sensors 201 of the vehicle 101 may also include component sensors 231, including tachometer 232, steered wheel position sensor 233, brake engine engagement sensor 234, wheel speed sensor 235, selected gear sensor 236, brake locking sensor 237, gear stick sensor 238, turn signal indicator sensor 239, and vehicle level sensor 240. In addition, external sensors 251 of the vehicle 101 may include a forward camera 252, right side camera 253, left side camera 254, rear camera 255, wetness/humidity sensor 256, external thermometer 257, light/lighting level sensor 258, terrain sensor 259, and external object motion sensor 260. Singles from one or more of these internal sensors 201 and external sensors 251 may be transmitted to sensor interface 273 of the ECU 271. Such information may be "pushed" to sensor interface 273 of the ECU 271, or sensor interface 273 may query one or more sensors for such signals or data. Such and other data may be stored in memory 285, for example, for a period of time and may be accessed later to compare with more recent data.

Also shown in FIG. 2 are external server 291 and devices 293 and 295 which may communicate via network 299 with the external communication 277 of the ECU 271. Audible output determiner 275 may be part of processing circuitry, and sensor interface 273 may be part of communication circuitry of the ECU 271. Based on processing performed by audible output determiner 271, instructions may be transmitted to horn controller 279 to access an audible output or an audible output type in sound library 283 and, accordingly, to control output producer 281 to generate the audible output.

Figure 3:
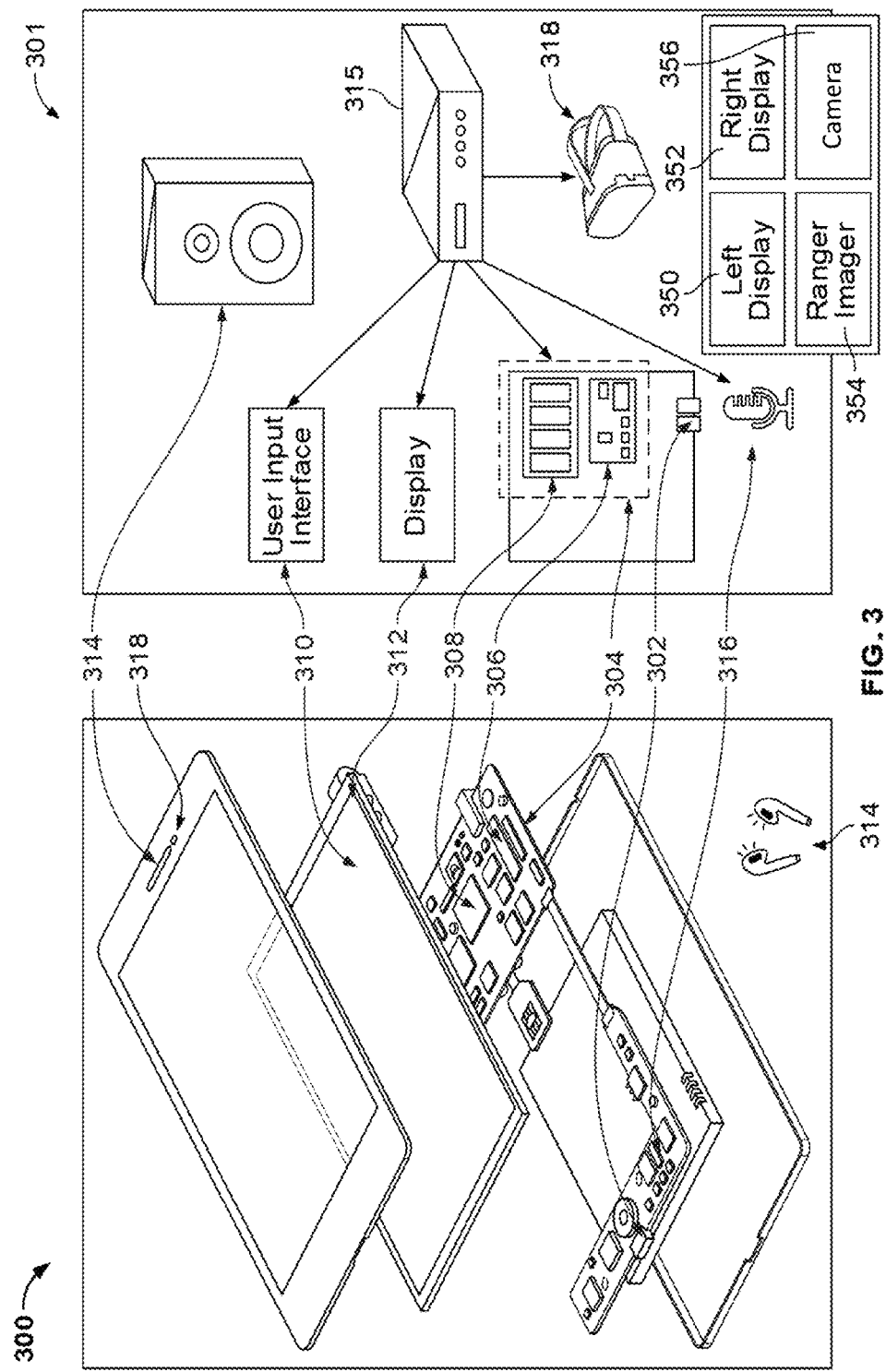
FIG. 3 illustrates an example of a computing device and peripherals, according to an aspect of the disclosure.
Figure 4:
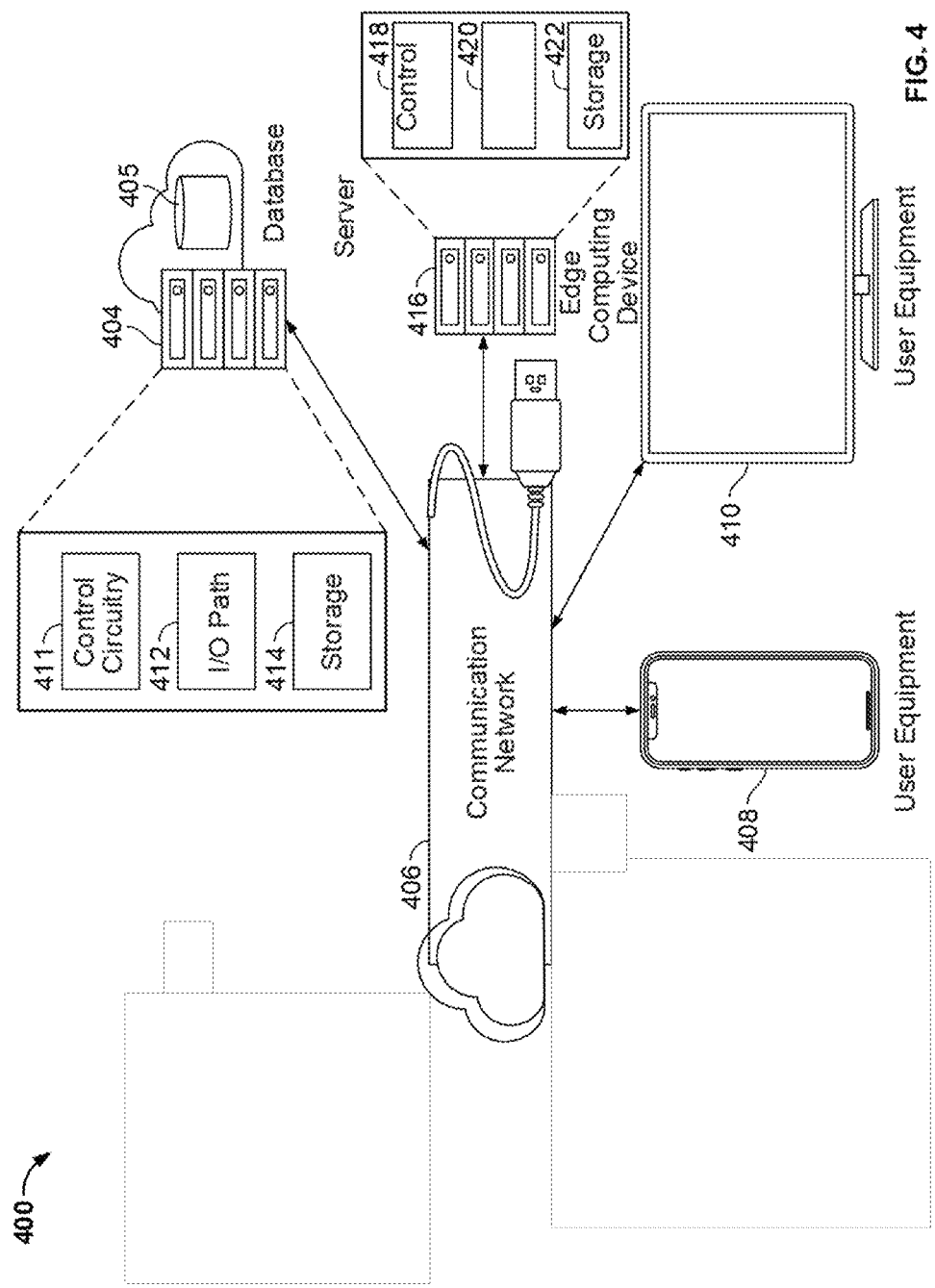
FIG. 4 is a schematic illustration of a system that includes a physical device and external system communicating over a network, according to an aspect of the disclosure.

FIGS. 3-4 describe illustrative devices, systems, servers, and related hardware for AR generation. FIG. 3 illustrates an example of an implementation of the ECU 271, including some components thereof. FIG. 3 shows generalized embodiments of illustrative user equipment devices 300 and 301, which may correspond to, e.g., computing devices 271 and 291. For example, user equipment device 300 may be provided as part of the vehicle 101 or a control system thereof, may be a smartphone device, a tablet, a virtual reality or augmented reality device, or any other suitable device capable of processing data. Audible output generator 315 may be communicatively connected to microphone 316, audio output equipment (e.g., speaker or headphones 314), and display 312. In some embodiments, display 312 may be a vehicle audio-visual display or a handheld device display. In some embodiments, user input interface 310 may be a remote device. In some embodiments, the circuit boards referenced herein may include control circuitry, processing circuitry, and storage (e.g., RAM, ROM, hard disk, removable disk, etc.). In some embodiments, the circuit boards may include an input/output path.

User equipment device 300 may receive content and data via input/output (I/O) path 302 that may comprise I/O circuitry (e.g., network card, or wireless transceiver). I/O path 302 may provide content (e.g., broadcast programming, on-demand programming, Internet content, content available over a local area network (LAN) or wide area network (WAN), and/or other content) and data to control circuitry 304, which may comprise processing circuitry 306 and storage 308. Control circuitry 304 may be used to send and receive commands, requests, and other suitable data using I/O path 302, which may comprise I/O circuitry. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable circuitry and may include processing circuitry 306. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry may be distributed across multiple separate processors or processing units, for example, multiple of the same type of processing units (e.g., two Intel Core i9 processors) or multiple different processors (e.g., an Intel Core i7 processor and an Intel Core i9 processor). In some embodiments, control circuitry 304 executes instructions for an AR application stored in memory (e.g., storage 308).

In client/server-based embodiments, control circuitry 304 may include communications circuitry suitable for communicating with a server or other networks or servers. Computing device 404 may be a part of a local area network with one or more of devices 300 or may be part of a cloud computing environment accessed via the internet. In a cloud computing environment, various types of computing services for performing searches on the internet or informational databases, providing AR generation, providing storage (e.g., for a database) or parsing data (e.g., using machine learning algorithms described above and below) are provided by a collection of network-accessible computing and storage resources (e.g., computing device 404 and/or edge computing device 416), referred to as "the cloud." Device 400 may be a cloud client that relies on the cloud computing capabilities from computing device 404 to determine whether processing (e.g., at least a portion of virtual background processing and/or at least a portion of other processing tasks) should be offloaded from the mobile device, and facilitate such offloading. When executed by control circuitry of computing device 404 or 416, the AR application may instruct control 411 or 418 circuitry to perform processing tasks for the client device and facilitate the AR generation.

Control circuitry 304 may include communications circuitry suitable for communicating with a server, edge computing systems and devices, a table or database server, or other networks or servers The instructions for carrying out the above mentioned functionality may be stored on a server (which is described in more detail in connection with FIG. 4). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as AR application data described above (e.g., database 420). Nonvolatile memory may also be used (e.g., to launch a boot-up routine and other instructions). Cloud-based storage, described in relation to FIG. 3, may be used to supplement storage 308 or instead of storage 308.

Control circuitry 304 may include video and audio and/or audible output generating circuitry and tuning circuitry. Encoding circuitry (e.g., for converting over-the-air, analog, or digital signals to MPEG signals for storage) may also be provided. Control circuitry 304 may also include scaler circuitry for upconverting and downconverting content into the preferred output format of user equipment 300. Control circuitry 304 may also include digital-to-analog converter circuitry and analog-to-digital converter circuitry for converting between digital and analog signals. The tuning and encoding circuitry may be used by user equipment device 300, 301 to receive and to display, to play, or to record content. The circuitry described herein, including for example, the tuning, video generating, encoding, decoding, encrypting, decrypting, scaler, and analog/digital circuitry, may be implemented using software running on one or more general purpose or specialized processors.

Control circuitry 304 may receive instruction from a user by way of user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of each one of user equipment device 300 and user equipment device 301. For example, display 312 may be a touchscreen or touch-sensitive display. In such circumstances, user input interface 310 may be integrated with or combined with display 312. In some embodiments, user input interface 310 includes a remote-control device having one or more microphones, buttons, keypads, any other components configured to receive user input or combinations thereof. For example, user input interface 310 may include a handheld remote-control device having an alphanumeric keypad and option buttons. In a further example, user input interface 310 may include a handheld remote-control device having a microphone and control circuitry configured to receive and identify voice commands and transmit information.

Audio output equipment 314 may be integrated with or combined with display 312. Display 312 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 312. Audio output equipment 314 may be provided as integrated with other elements of each one of device 300 and equipment 301 or may be stand-alone units. An audio component of videos and other content displayed on display 312 may be played through speakers (or headphones) of audio output equipment 314. In some embodiments, audio may be distributed to a receiver (not shown), which processes and outputs the audio via speakers of audio output equipment 314. In some embodiments, for example, control circuitry 304 is configured to provide audio cues to a user, or other audio feedback to a user, using speakers of audio output equipment 314. There may be a separate microphone 316 or audio output equipment 314 may include a microphone configured to receive audio input such as voice commands or speech. For example, a user may speak letters or words that are received by the microphone and converted to text by control circuitry 304. In a further example, a user may voice commands that are received by a microphone and recognized by control circuitry 304. AR display device 318 may be any suitable AR display device (e.g., an integrated head mountain display or AR display device connected to a system 300). Video cameras 356 may be integrated with the equipment or externally connected. One or more of cameras 356 may be a digital camera comprising a charge-coupled device (CCD) and/or a complementary metal-oxide semiconductor (CMOS) image sensor. In some embodiments, one or more of cameras 356 may be dirtied at outside physical environment (e.g., two cameras may be pointed out to capture to parallax views of the physical environment). In some embodiments, one or more of cameras 356 may be pointed at user's eyes to measure their rotation to be used as biometric sensors. In some embodiments, AR display device 318 may comprise other biometric sensor or sensors to measure eye rotation (e.g., electrodes to measure eye muscle contractions).

An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Data for use by a thick or thin client implemented on each one of user equipment device 300 and user equipment device 301 may be retrieved on-demand by issuing requests to a server remote to each one of user equipment device 300 and user equipment device 301. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on device 300. This way, the processing of the instructions is performed remotely by the server while the resulting displays (e.g., that may include text, a keyboard, or other visuals) are provided locally on device 300.

FIG. 4 is a diagram of an illustrative system 400 for audible output selection, control and generation, in accordance with some embodiments of this disclosure. User equipment devices 407, 408, 410 (e.g., which may correspond to one or more of computing device 212) may be coupled to communication network 406. Communication network 406 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 406) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 4 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 406.

System 400 may comprise media content source 402, one or more servers 404, and one or more edge computing devices 416 (e.g., included as part of an edge computing system, such as, for example, managed by mobile operator 206). In some embodiments, the audio output determiner component 275 and/or the horn controller 279 may be one or more applications executed at one or more of control circuitry 411 of computing device 404 (and/or control circuitry of user equipment devices 407, 408, 410 and/or control circuitry 418 of edge computing device 416). In some embodiments, a data structure associated with device 300 of FIG. 3, may be stored at database 405 maintained at or otherwise associated with computing device 404, and/or at storage 422 and/or at storage of one or more of user equipment devices 407, 408, 410.

In some embodiments, computing device 404 may include or be connected with control circuitry 411, which may include processing circuitry, and storage 414 (e.g., RAM, ROM, Hard Disk, Removable Disk, etc.). The ECU 271 may be implemented as part of computing device 404. Storage 414 may store one or more databases. Computing device 404 may also include an input/output path 412. I/O path 412 may provide data over a local area network (LAN) or wide area network (WAN), and/or other content and data to control circuitry 411, which may include processing circuitry, and storage 414. Control circuitry 411 may be used to send and receive commands, requests, and other suitable data using I/O path 412, which may comprise I/O circuitry. I/O path 412 may connect control circuitry 411 (and specifically control circuitry) to one or more communications paths.

Control circuitry 411 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 411 may be distributed across multiple separate processors or processing units, for example, multiple of the same type of processing units (e.g., two Intel Core i9 processors) or multiple different processors (e.g., an Intel Core i7 processor and an Intel Core i9 processor). In some embodiments, control circuitry 411 executes instructions for an emulation system application stored in memory (e.g., the storage 414). Memory may be an electronic storage device provided as storage 414 that is part of control circuitry 411.

Edge computing device 416 may comprise control circuitry 418, I/O path 420 and storage 422, which may be implemented in a similar manner as control circuitry 411, I/O path 412 and storage 424, respectively of computing device 404. Edge computing device 416 may be configured to be in communication with one or more of user equipment devices 407, 408, 410 and video computing device 404 over communication network 406, and may be configured to perform processing tasks in connection with ongoing processing of data, for example, destination selection and audible output selection. In some embodiments, a plurality of edge computing devices 416 may be strategically located at various geographic locations, and may be mobile edge computing devices configured to provide processing support for mobile devices at various geographical regions.

FIG. 5 illustrates examples of how vehicle driving characteristics may be combined with ambient conditions by the system according to the present disclosure to generate an audible output. By way of example, as shown in FIG. 5, a relevant driving factor 511 may be that the vehicle has stopped for 12 seconds or longer, according to Situation 1. In this case, a timer, for example provided as part of ECU 271 or connected there too may time how long the vehicle has been stopped. A further factor in situation one may be a temporal factor 521, which may be thought of as a type of ambient condition. In this case, the time may be 2:00 AM. A clock may be provided as part of or as connected to ECU 271 and consulted to determine a time of day condition. As further provided in Situation 1, one or more additional ambient conditions or environmental factors 531 may be considered, such as, the fact that the vehicle is positioned near an intersection, that a traffic light has turned green two or more seconds ago, that the vehicle is in a residential neighborhood, that the ambient noise level currently around the vehicle is 32 dBA, and/or that local regulations require the horn to be audible from at least 200 feet away. Based on one or more such driving characteristics and/or based on one or more such ambient conditions, the system may determine to generate an audible output 541 at 60 dBA. An appropriate non-threatening, gentle tune 551, for example, a soft, short pulse, may also be selected.

A second situation, Situation 2, is also described in FIG. 5: vehicle driving characteristics 511 include that the vehicle 101 was recently driving at a high speed, for example 80 mph, and/or that the vehicle 101 is now swerving, and/or that the vehicle brake pedal has been activated with a strong force. The system may keep track of vehicle driving characteristics for a number of seconds to be able to compare current and recent vehicle driving characteristics. In this case, if the vehicle was driving at 80 mph 4-9 seconds ago that may be quite relevant to an overall state of the vehicle. Also relevant would be whether the vehicle was driving at a steady speed before the steady acceleration. (The term acceleration as used herein may also include deceleration.) For this reason, the working memory 285 accessible by the ECU 271 may keep a record of recent vehicle driving characteristics and/or recent ambient conditions. Situation 2 may include no information about the current time of day and this factor may be irrelevant and may be ignored by the system, in an embodiment. Situation 2 may also entail, and the system may take into consideration in connection with therewith ambient conditions or relevant environmental factors 531, such as a wet terrain, for example, detected by onboard sensors 256 or based on information accessed from an external source, such as external server 291 via network 299 connected with external communication 277 of ECU 271. Additional pieces of information may be accessed from one or more external servers 291 as needed and stored in working memory 285. Memory 285 may thus store an array of internal sensor and external sensor data as well as other data relevant to ambient conditions and this information may be accessed as needed by audible output determiner 275 for generating audible output. Based on factors with respect to situation 2, the system determines that the horn type 541 will be an emergency alarm type tune and that the volume 551 will be at 82 dBA. According to an embodiment, a user may in advance a select one or more tunes to be generated in such emergency conditions.

Figure 6:
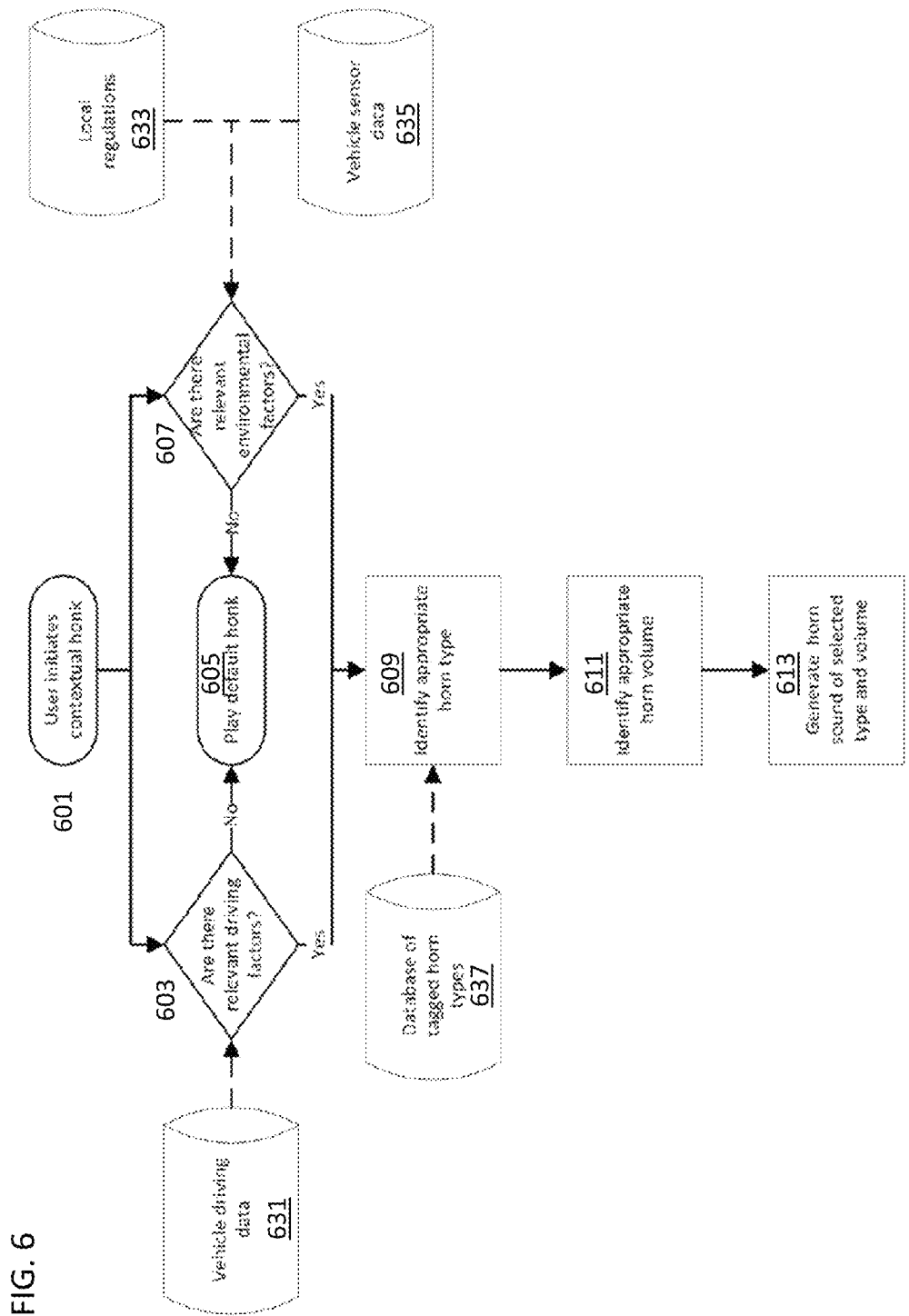
FIG. 6 is an example of a process for generating an audible output, according to an aspect of the disclosure.

FIG. 6 shows an example of a system according to the present disclosure. As shown in FIG. 6, at 601, a driver initiates the audible output by pressing a horn bar on a steering wheel, pressing a horn button or the like, or by triggering a horn of a vehicle in some other way. For example, a user may activate a horn by a speech command or foot pedal.

At 603, it is determined whether a relevant vehicle driving characteristic exists, for example, by accessing memory 631, which stores recent vehicle driving characteristics. If it is determined that vehicle driving characteristics call for a particular audible output tune or audible output tune type or for a particular horn volume, then processing continues at 609. If not, then at 605 a default audible output may be generated. The default audible output may be a honk configured by the vehicle's manufacturer.

At 607, it is determined whether an ambient condition exists relevant to the generation of a horn audible output volume and/or tune. Vehicle sensor data stored in memory 635 may be accessed to check one or more ambient conditions. Also, local regulations stored in memory 633 may be accessed to check for ambient conditions, such as noise ordinances or other rules. If no relevant ambient conditions are determined then the default audible output may be generated.

At 609, in response to determining the relevant vehicle driving characteristic(s) and/or in response to determining the relevant ambient conditions, an appropriate audible output is selected. The system may access a database of horns 637 to select the audible output. In an embodiment, relevant vehicle driving characteristics alone may be used to determine audible output sound and volume. In another embodiment, relevant ambient conditions alone may be used to determine audible output sound and volume. According to a further embodiment, relevant vehicle driving characteristics in combination with ambient conditions are used to determine audible output sound and volume.

There may be several audible output types—several recordings of audible output may be available for each horn type, and an audible output is selectable in the database 637 for any given vehicle driving characteristic and/or ambient condition from the appropriate audible output type. The driver may in advance select one of the audible outputs available for each horn type. For example, the driver may select a tune to be played in an emergency situation that is available from a library of audible outputs of a first category or horn "genre", and the driver may further select an audible output from among several friendly non-threatening audible outputs in a second category or horn "genre".

At 611, an audible output volume is selected based on the determined vehicle driving characteristic(s) and/or based on the determined ambient condition(s). In an embodiment, the audible output volume is automatically set in accordance with the audible output tune type. For example, the system may select a high volume for a tune determined in response to a vehicle driving characteristic associated with a high vehicle speed emergency situation. At 613, the selected audible output is generated according to the identified audible output tune and volume by activating the speaker(s) and/or horn(s) and/or other sound producing device(s).

Figure 7:
FIG. 7 illustrate a further feature of the system, according to an aspect of the disclosure.

FIG. 7 illustrates a graphical user interface displaying to the driver that the audible output is suppressed because of ambient conditions, according to a further embodiment. The audible output may be suppressed for a variety of ambient conditions detected by sensors external sensors 251. For example, a trained machine learning model may determine, based on analysis of one or more photographs captured by one or more cameras 252-255 of the vehicle 101, that a nearby automobile has no driver at the driver's seat. Or it may be determined that no pedestrian is near the vehicle 101. Further the vehicle driver characteristics may show no emergency condition, such as high speed, swerving and the like, and thus the system may infer that the triggering of the horn activator was likely because the vehicle 101 has been stopped add the horn was intended for nearby vehicle detected by the cameras. For this reason, the system may suppress (not generate) the audible output. As also shown in FIG. 7, a notification to the driver may be provided that the honk has been suppressed. A reason for suppressing the audible output may also be provided, in this case, that the "honkee car"—the vehicle with which communication via the horn was seemingly intended—is empty.

Figure 8A:
FIGS. 8A and 8B illustrate selection and creation of audible outputs, according to an aspect of the disclosure.
Figure 8B:
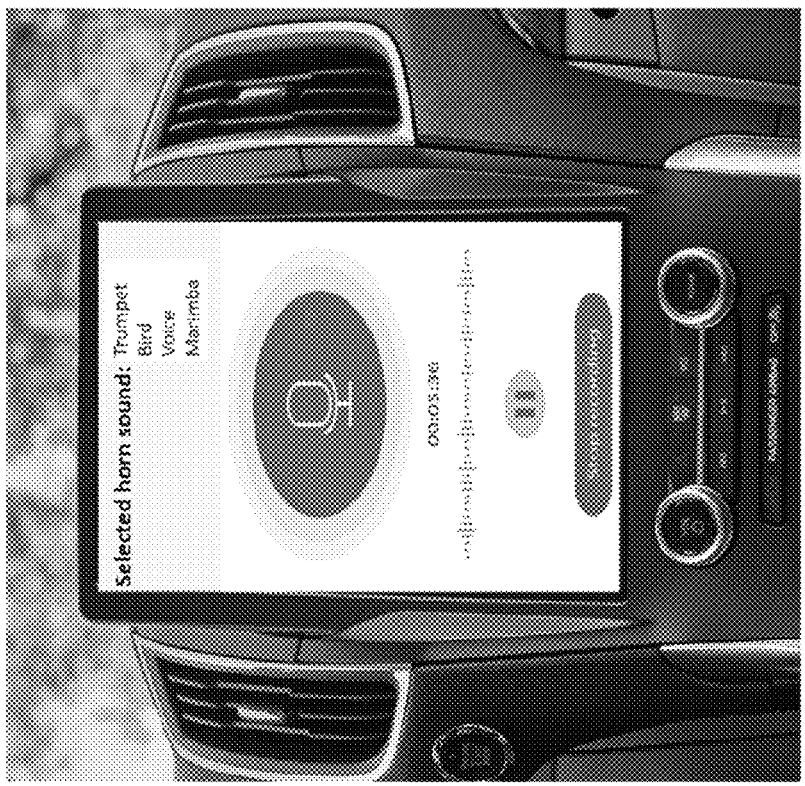

FIGS. 8A-8B illustrate, respectively, audible output selection and audible output recording for an audible output to be stored in the audible output database 637, according to an embodiment. A library of audible outputs may be stored, and one or more audible outputs may be selected for various scenarios. For example, a first audible output may be selected from a catalog of similar alarm-type audible outputs for an emergency type scenario in which the audible output functions as a loud alarm to warn other vehicles, and a second audible output may be selected for a quiet scenario in which a polite, non-threatening horn is intended in a quiet neighborhood. Audible outputs may be downloaded via a network and added to the local library of audible outputs. As shown in FIG. 8B, an audible output may also be recorded onto the library and an audible output may also be edited. Audible outputs may be uploaded to the cloud or to a nearby device and/or shared with other vehicles or devices.

Figure 9:
FIG. 9 illustrates how audible outputs may be downloaded, uploaded and traded, according to an aspect of the disclosure.

FIG. 9 illustrates that a library of various categories of audible outputs may be downloaded from, and/or uploaded to, the cloud and/or shared with a device. Further, audible outputs may be exchanged or shared with other vehicles or devices, or selected by users inside or outside the vehicle 101. For example, a user may use a handheld device, or other type of computing device, to select an audible output for various scenarios, or to add to the database 637 of the vehicle 101 an audible output for one more scenarios.

FIG. 10 illustrates a process according to an embodiment of the disclosure in which an audible output is previous set for meeting the vehicle. Selective communication with a target device may be achieved because a device is associated with the destination of the vehicle 101.

As shown in FIG. 10, at 1002, a first audible output is associated with the first device 293 (shown in FIG. 2). For example, a cellphone of a user heading to a destination intending to meet the vehicle 101 may be used to communicate a particular tune, musical piece, or pattern of tones, pitches, horn toots of other sounds to be output as the first audible output. For example, the user may select a tune on a music application running on the user's handheld device and associate it as the audible output, or the user may select, via a ride sharing/taxi application running on the user's device, an audible output available on a server associated with the ride sharing/taxi application. The audible output may be downloaded to the user's device, or it may be transmitted automatically from the server associated with the ride share/taxi application to the vehicle, in response to the user's selection of the audible output for the ride/destination. Or, the audible output may be transmitted automatically from the user's device to the vehicle, in response to the user's selection of the audible output for the ride/destination. In a further embodiment, the system may automatically select the audible output from a profile associated with the user, for example, the system may access the profile via the user's handheld device, or the system may automatically select the audible output from a selection available at a server associated with a ride sharing/taxi application. The first audible output may be selected by a driver of the vehicle 101 and communicated to the first device 293, or vice versa: the first audible output may be selected by the user of the first device 293 and communicated to the vehicle 101. The first audible output may be automatically selected and communicated to both the vehicle 101 and to the first device 293 by a central system, such as external server 291 running or supporting a ride sharing application. The first audible output may be stored in the database 637 of the vehicle 101 and/or by a central node, such as a server associated with the ride sharing/taxi application and associated with this ride, user and/or destination. It may, instead, or also, be stored in the first device 293. At the time of selection and association with a first destination or with the first device 293, the first audible output may be generated for play on the first device 293 and/or by the vehicle 101, internally and/or outside the vehicle to associate the first audible output with the trip entailing the first destination, the first device 293 and the vehicle 101.

In an embodiment, a user may be shown tunes for audible outputs that are available at any given time for the destination. For example, in a ride sharing or taxi service application, audible outputs may be selected for a destination for a given pick up time only if that tune has not been previously selected by another user for another car at that destination. The term "destination" as used herein may sometimes mean a pickup point or meeting point at which the vehicle is to meet the passenger or rider or may mean a final destination. For example, a meeting point may be a given street intersection where the vehicle is to meet the passenger, and to signal the passenger using the audible output, while the final destination may be the place to which, after the pickup of the passenger at the meeting point, the vehicle is to deliver the passenger. In an embodiment, the same or a different audible output may be selected and sounded at the final destination or drop off point to signal that the passenger has arrived at the delivery point. For example, a parent of a child or hosts of an out-of-town visitor may thus be signaled that the passenger has arrived. In an embodiment, upon triggering the horn activator, the vehicle may output this audible output. The system may selectively enable and disable the selection of a sound profile or tune (e.g., within a taxi/limousine app used by the user and/or by the driver) based on other devices' selections in the proximity of the pickup destination and near the estimated time of arrival (ETA) of the vehicles associated with the devices. For example, ride ids to a certain destination (e.g., Airport X, or Terminal Y arrival curb of Airport X) can be grouped and existing ETAs can be compared to the ETA of the new ride request to determine what sound profile or tune can and cannot be selected. Similarly, the app may automatically select and assign an available sound profile or tune to the user, or the user may select a sound profile category, such as a genre of music, artist, album, or the like, and the app may automatically select and assign an available sound profile or tune for the user from within the genre of music, artist, album, or the like selected by the user. A particular sound profile or tune can be selected after the ride has been requested.

At 1004, an indication of a first destination of the vehicle is received. For example, a user of the first device 293 may enter in the first device 293 an intent to proceed to a particular destination, for example, the user may intend to land at a particular terminal of a particular airport and request the vehicle 101 to meet there and be picked up. Or, the vehicle 101 may signal a plan to proceed to the first destination and one or more devices may be pinged as to which one(s) plan to meet at the first destination. For example, a ride sharing service may arrange for pickups by a shared vehicle.

At 1006, an indication of second audible output it is associated with a second device 295. The second audible output may be used for distinguishing the user of the first device 293 from the user of the second device 295.

At 1008, an indication of a second destination of the vehicle 101 is received. For example, user of the second device 295 may enter an intention to be at the second destination at a particular time and may request pick up by the vehicle 101 at that time at the second destination. The second destination may be identical with the first destination. If the first audible output is different from the second audible output then the users of the first and second devices will know whom the vehicle 101 is coming to meet.

A determination is made at 1010, as to whether the vehicle 101 has reached the first destination. If so, then at 1012 the first audible output may be automatically generated. Or, the first audible output may be generated if it is determined that the vehicle 101 is at the first destination and the horn activator is triggered by the driver.

In an embodiment, the first audible output is generated to be output by the first device 293 in addition to, or instead of, being output by the vehicle 101. For example, a user of the first device 293 standing outside a busy airport terminal may be notified both by the familiar first audible output provided by the first device 293 and by the first audible output being provided by the vehicle 101. In an embodiment, the vehicle 101 may provide the first audible output when the horn activator is triggered, and the vehicle 101 may also communicate with the first device 23 to request that the first device 23 provide the first audible output. Or, the first audible output may be generated by the vehicle 101 when the vehicle 101 reaches the first destination and the vehicle may prompt the driver to trigger the horn activator. Triggering the horn activator would then generate the first audible output by the vehicle 101.

In a further embodiment, the first device 293 may determine that the vehicle is at the first destination by sensing a proximity of the vehicle. For example, a position of the vehicle 101 may be known to the first device 293. The vehicle 101 may have a GPS device which signals its position, for example, via a cellular telephone network to an external server to 291 in communication with the first device 293. In response to a determination by the first device 293 that the vehicle 101 is at the first destination, the first device 293 may communicate directly, or via the external server 291, with the vehicle 101 and may request that the vehicle 101 generate the first audible output. Or, the request may be directed to a driver of the vehicle 101, and the first audible output 10 may be generated by the vehicle 101 if the driver triggers the horn activator of the 101. In addition, or instead, external server 291 may receive notification that the vehicle 101 has reached the first destination and may signal the vehicle 101 to generate the first audible output or may request the driver to trigger the horn activator. For example, a graphical user interface at the vehicle 101 may be used to notify the driver. The graphical user interface may also be used by the driver to trigger activation of the horn. A notification may also be provided to the first device to 93 that the vehicle 101 has reached the first destination.

Also, the first device 293 may transmit notification to the vehicle 101 that the first device 293 has reached the first destination. In an embodiment, the vehicle 101 may be requested by the first device 293 to generate the first audible output automatically when the first device 293 has reached the first destination. Or, the driver of the vehicle 101 may be notified automatically that the first device 293 has reached the first destination and may be requested to trigger the horn activator.

At 1014, a determination is made as to whether the vehicle 101 has reached the second destination. If so, then at 1016 the second audible output may be automatically generated and output by the vehicle 101. The second output may be the same as the first audible output, for example, if the first and second destinations are different and thus they are intended to get the attention of different users.

The methods or processes 600 and 1000 may be implemented, in whole or in part, by the system(s) described herein and shown in the figures. One or more actions of the depicted processes may be incorporated into or combined with one or more actions of any other process or embodiments described herein. The processes may be saved to a memory as one or more instructions or routines that may be executed by a corresponding device or system to implement the process. Depending on the embodiment, one or more steps of the described process may be implemented or facilitated by a server.

The term "and/or," may be understood to mean "either or both" of the elements thus indicated. Additional elements may optionally be present unless excluded by the context. Terms such as "first," "second," "third" in the claims referring to a structure, module or step should not necessarily be construed to mean precedence or temporal order but are generally intended to distinguish between claim elements.

The above-described embodiments are intended to be examples only. Components or processes described as separate may be combined or combined in ways other than as described, and components or processes described as being together or as integrated may be provided separately. Steps or processes described as being performed in a particular order may be re-ordered or recombined.

Features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time.

It should also be noted that the systems and/or methods described above may be applied to, or used in accordance with, other systems and/or methods. In various embodiments, additional elements may be included, some elements may be removed, and/or elements may be arranged differently from what is shown. Alterations, modifications and variations can be affected to the particular embodiments by those of skill in the art without departing from the scope of the present application, which is defined solely by the claims appended hereto.

What is claimed is:

1. A method comprising:
    associating, by processing circuitry, a first device with an indication of a first audible output tune of an audible output of a vehicle, wherein the first device is distinct from the vehicle;
    receiving, based on user input on the first device, an indication of a first destination for the first device;
    associating a second device distinct from the first device and distinct from the vehicle, with an indication of a second audible output tune of the audible output of the vehicle, wherein the second audible output tune is distinct from the first audible output tune;
    receiving, based on user input on the second device, an indication of a second destination for the second device;
    in response to determining that the vehicle is at the first destination, generating by the processing circuitry, according to the first audible output tune, a first audible output for the vehicle; and
    in response to determining that the vehicle is at the second destination, generating by the processing circuitry, according to the second audible output tune, a second audible output for the vehicle.

2. The method of claim 1, wherein the first destination is the same as the second destination.

3. The method of claim 1, wherein the generating the first audible output is at a first time; and further comprising:
    generating according to the first audible output tune at a volume higher than the first audible output, at a second time subsequent to the first time, a third audible output for the vehicle.

4. The method of claim 1, wherein the indication of the first audible output tune is associated with the first device based on user input at the first device.

5. The method of claim 1, wherein the indication of the first audible output tune is associated based on information accessed in a user profile associated with the first device or based on information accessed via an application on the first device.

6. The method of claim 1, further comprising: generating for output by the first device the first audible output.

7. The method of claim 1, further comprising:
    in response to determining that the first device is at the destination, generating for output by the first device the first audible output.

8. The method of claim 1, further comprising:
    in response to determining that the first device is at the destination, generating for output by the vehicle the first audible output.

9. The method of claim 1, further comprising:
    in response to determining that a user associated with the first device is at the destination, generating for output by the vehicle the first audible output.

10. The method of claim 1, wherein the first destination is a meeting point, wherein the vehicle is scheduled, according to the user input on the first device, to meet a user associated with the first device at the meeting point and to deliver the user to a final destination indicated by the user input.

11. A system comprising:
    a memory configured to store audible output tunes; and
    processing circuitry configured:
    to associate in the memory a first device with an indication of a first audible output tune of an audible output of a vehicle, wherein the first device is distinct from the vehicle;

to receive, based on user input on the first device, an indication of a first destination for the first device;

to associate a second device distinct from the first device and distinct from the vehicle, with an indication of a second audible output tune of the audible output of the vehicle, wherein the second audible output tune is distinct from the first audible output tune;

to receive, based on user input on the second device, an indication of a second destination for the second device;

in response to determining that the vehicle is at the first destination, to generate according to the first audible output tune, a first audible output for the vehicle; and in response to determining that the vehicle is at the second destination, to generate, according to the second audible output tune, a second audible output for the vehicle.

12. The system of claim 11, wherein the first destination is the same as the second destination.

13. The system of claim 11, wherein the generating the first audible output is at a first time; and wherein the processing circuitry is configured:

to generate, according to the first audible output tune at a volume higher than the first audible output, at a second time subsequent to the first time, a third audible output for the vehicle.

14. The system of claim 11, wherein the indication of the first audible output tune is associated with the first device based on user input at the first device.

15. The system of claim 11, wherein the indication of the first audible output tune is associated based on information accessed in a user profile associated with the first device or based on information accessed via an application on the first device.

16. The system of claim 11, wherein the processing circuitry is configured to generate for output by the first device the first audible output.

17. The system of claim 11, wherein the processing circuitry is configured to generate the first audible output for output by the first device, in response to determining that the first device is at the destination.

18. The system of claim 11, wherein the processing circuitry is configured to generate the first audible output for output by the vehicle, in response to determining that the first device is at the destination.

19. The system of claim 11, wherein the processing circuitry is configured to generate the first audile output by the vehicle in response to determining that a user associated with the first device is at the destination.

20. The system of claim 11, wherein the first destination is a meeting point, wherein the vehicle is scheduled, according to the user input on the first device, to meet a user associated with the first device at the meeting point and to deliver the user to a final destination indicated by the user input.

* * * * *